(12) United States Patent
Hoisko (10) Patent No.: US 7,755,566 B2
(45) Date of Patent: Jul. 13, 2010

(54) DISPLAYING AN IMAGE

(75) Inventor: Jyrki Hoisko, Oulu (FI)

(73) Assignee: Nokia Corporation, Espoo (FI)

( * ) Notice: Subject to any disclaimer, the term of this patent is extended or adjusted under 35 U.S.C. 154(b) by 853 days.

(21) Appl. No.: 10/034,237

(22) Filed: Dec. 27, 2001

(65) Prior Publication Data

US 2002/0113757 A1 Aug. 22, 2002

(30) Foreign Application Priority Data

Dec. 28, 2000 (GB) .................................. 0031752.9

(51) Int. Cl.
*G09G 5/14* (2006.01)
(52) U.S. Cl. .................... 345/1.2; 345/632; 345/629; 345/1.1
(58) Field of Classification Search ................ 345/1.1, 345/1.2, 632, 629; 348/239, 241, 333.12, 348/333.02, 333.03, 222.1, 207.1, 207.2, 348/207.11
See application file for complete search history.

(56) References Cited

U.S. PATENT DOCUMENTS

| | | | | |
|---|---|---|---|---|
| 4,554,591 A | | 11/1985 | Kee ............................. 358/256 |
| 4,586,038 A | * | 4/1986 | Sims et al. .................. 345/586 |
| 5,467,142 A | | 11/1995 | Ichinokawa ................. 348/556 |
| 5,487,172 A | * | 1/1996 | Hyatt ............................ 712/32 |
| 5,650,826 A | | 7/1997 | Eitz ............................ 348/468 |
| 5,689,269 A | | 11/1997 | Norris |
| 5,692,117 A | * | 11/1997 | Berend et al. ................ 345/475 |
| 5,734,441 A | * | 3/1998 | Kondo et al. ................ 348/700 |
| 5,821,523 A | * | 10/1998 | Bunte et al. ............ 235/472.01 |
| 5,903,309 A | * | 5/1999 | Anderson .............. 348/333.02 |
| 5,999,696 A | * | 12/1999 | Tsuga et al. .................. 386/98 |
| 6,091,956 A | * | 7/2000 | Hollenberg .............. 455/456.5 |
| 6,108,597 A | * | 8/2000 | Kirchner et al. ............... 701/23 |
| 6,125,175 A | * | 9/2000 | Goldberg et al. ........ 379/201.01 |
| 6,137,457 A | * | 10/2000 | Tokuhashi et al. ............. 345/8 |
| 6,167,469 A | * | 12/2000 | Safai et al. ..................... 710/62 |
| 6,226,000 B1 | * | 5/2001 | Richens et al. .............. 345/419 |

(Continued)

FOREIGN PATENT DOCUMENTS

EP 0 964 593 A2 4/1999

(Continued)

OTHER PUBLICATIONS

Storytelling with digital photographs Marko Balabanović, Lonny L. Chu, Gregory J. Wolff, Apr. 2000 Proceedings of the SIGCHI conference on Human factors in computing systems, Publisher: ACM Press.*

(Continued)

*Primary Examiner*—Javid A Amini
(74) *Attorney, Agent, or Firm*—Banner & Witcoff, Ltd.

(57) ABSTRACT

An image can be displayed based on image data by means of a user equipment. In the disclosed method image data associated with the image is received at a user equipment from a data communication system. A visual effect is generated based on additional information associated with the image. The visual effect is subsequently presented in association with a version of the image by displaying said visual effect by display means of the user equipment. The image is also by the display means, either after or before the display of the visual effect.

78 Claims, 4 Drawing Sheets

U.S. PATENT DOCUMENTS

| | | | |
|---|---|---|---|
| 6,252,563 B1* | 6/2001 | Tada et al. | 345/1.1 |
| 6,262,694 B1* | 7/2001 | Ishimoto et al. | 345/1.1 |
| 6,271,805 B1* | 8/2001 | Yonezawa | 345/1.1 |
| 6,321,024 B1* | 11/2001 | Fujita et al. | 386/55 |
| 6,321,158 B1* | 11/2001 | DeLorme et al. | 701/201 |
| 6,323,858 B1* | 11/2001 | Gilbert et al. | 345/419 |
| 6,373,508 B1* | 4/2002 | Moengen | 715/848 |
| 6,401,027 B1* | 6/2002 | Xu et al. | 701/117 |
| 6,426,778 B1* | 7/2002 | Valdez, Jr. | 348/461 |
| 6,435,969 B1* | 8/2002 | Tanaka et al. | 463/44 |
| 6,504,990 B1* | 1/2003 | Abecassis | 386/46 |
| 6,510,278 B1* | 1/2003 | Takayama | 386/52 |
| 6,519,571 B1* | 2/2003 | Guheen et al. | 705/14 |
| 6,546,188 B1* | 4/2003 | Ishii et al. | 386/52 |
| 6,573,907 B1* | 6/2003 | Madrane | 715/719 |
| 6,590,996 B1* | 7/2003 | Reed et al. | 382/100 |
| 6,606,117 B1* | 8/2003 | Windle | 348/239 |
| 6,618,051 B1* | 9/2003 | Edwards et al. | 345/427 |
| 6,631,239 B1* | 10/2003 | Hamada | 386/52 |
| 6,657,658 B2* | 12/2003 | Takemura | 348/207.99 |
| RE38,401 E* | 1/2004 | Goldberg et al. | 715/720 |
| 6,747,642 B1* | 6/2004 | Yasumoto | 345/419 |
| 6,831,682 B1* | 12/2004 | Silverbrook et al. | 348/207.2 |
| 6,871,231 B2* | 3/2005 | Morris | 709/225 |
| 6,906,818 B1* | 6/2005 | Makishima | 358/1.15 |
| 6,952,684 B2* | 10/2005 | Toshikage et al. | 705/54 |
| 6,976,229 B1* | 12/2005 | Balabanovic et al. | 715/838 |
| 6,977,630 B1* | 12/2005 | Donath et al. | 345/7 |
| 6,990,246 B1* | 1/2006 | Ferguson | 382/240 |
| 7,003,061 B2* | 2/2006 | Wilensky | 375/360 |
| 7,165,071 B2* | 1/2007 | Fanning et al. | 707/10 |
| 7,302,585 B1* | 11/2007 | Proudler et al. | 713/189 |
| 2001/0000779 A1* | 5/2001 | Hayama et al. | 463/30 |
| 2001/0028399 A1* | 10/2001 | Conley | 348/239 |
| 2001/0053247 A1* | 12/2001 | Sowinski et al. | 382/162 |
| 2001/0055035 A1* | 12/2001 | Kinjo | 345/698 |
| 2002/0031262 A1* | 3/2002 | Imagawa et al. | 382/190 |
| 2002/0077086 A1* | 6/2002 | Tuomela et al. | 455/414 |
| 2002/0082007 A1* | 6/2002 | Hoisko et al. | 455/426 |
| 2002/0099661 A1* | 7/2002 | Kii et al. | 705/51 |
| 2002/0138827 A1* | 9/2002 | Yoshimine et al. | 725/1 |
| 2002/0181586 A1* | 12/2002 | Kondo et al. | 375/240.08 |
| 2003/0002715 A1* | 1/2003 | Kowald | 382/118 |
| 2003/0020707 A1* | 1/2003 | Kangas et al. | 345/418 |
| 2003/0025649 A1* | 2/2003 | Wynne Willson | 345/6 |
| 2003/0046241 A1* | 3/2003 | Toshikage et al. | 705/52 |
| 2003/0091329 A1* | 5/2003 | Nakata et al. | 386/52 |
| 2003/0120745 A1* | 6/2003 | Katagishi et al. | 709/217 |
| 2004/0002305 A1* | 1/2004 | Byman-Kivivuori et al. | 455/41.2 |
| 2004/0022453 A1* | 2/2004 | Kusama et al. | 382/284 |
| 2004/0218902 A1* | 11/2004 | Yanagita | 386/52 |
| 2005/0039111 A1* | 2/2005 | Abe et al. | 715/500.1 |
| 2005/0145701 A1* | 7/2005 | Silverbrook et al. | 235/473 |
| 2005/0203845 A1* | 9/2005 | Yoshimine et al. | 705/40 |
| 2006/0025116 A1* | 2/2006 | Silverbrook et al. | 455/414.1 |
| 2006/0036710 A1* | 2/2006 | Kaneko et al. | 709/217 |
| 2006/0056728 A1* | 3/2006 | Silverbrook et al. | 382/276 |
| 2006/0168141 A1* | 7/2006 | Yoshikai et al. | 709/219 |
| 2006/0257098 A1* | 11/2006 | Fukuda et al. | 386/52 |
| 2006/0274164 A1* | 12/2006 | Kimura et al. | 348/231.3 |
| 2007/0065110 A1* | 3/2007 | Juen et al. | 386/95 |

FOREIGN PATENT DOCUMENTS

| | | |
|---|---|---|
| GB | 2 210 531 A | 6/1999 |
| JP | 11088672 | 3/1999 |

OTHER PUBLICATIONS

Visual query and analysis tool of the object-relational GIS framework Zoran Stojanovic, Slobodanka Djordjevic-Kajan, Dragan Stojanovic Nov. 2000 proceedings of the ninth international conference on Information and knowledge management Publisher: ACM Press.*

Texture mapping 3D models of real-world scenes Frederick M. Weinhaus, Venkat Devarajan Dec. 1997, ACM Computing Surveys (CSUR), vol. 29 Issue 4.*

Sensing techniques for mobile interaction Ken Hinckley, Jeff Pierce, Mike Sinclair, Eric Horvitz, Nov. 2000, proceedings of the 13th annual ACM symposium on User interface software and technology Publisher: ACM Press.*

FDDI and timing requirements for image transmission B. Cousin Apr. 1992 Proceedings of the 1992 ACM annual conference on Communications CSC '92 Publisher: ACM Press.*

Digital Imaging Group, Inc; "DIG35 Specification-Metadata for Digital Images;" Aug. 30, 2000.

* cited by examiner

DISPLAYING AN IMAGE

FIELD OF THE INVENTION

The present invention relates to displaying an image, and in particular, but not exclusively, to displaying an image based on image data by means of a user equipment.

BACKGROUND OF THE INVENTION

Different types of images are known. An image may comprise, for example, a photograph of a target. The image may present a target such as a scenery, an object, or one or more living subjects such as one or more persons or animals. An image may also comprise a picture of a graphical or textual presentation and so on.

In addition to the conventional way of storing and presenting images on photographic paper or similar, image data can also be stored as digitised data in an appropriate data storage means such as in a hard disc of a computer or in a CD (compact disc). The image can then presented to a viewer by displaying the image on a display of a user equipment based on the image data. Such a user equipment typically comprises display means for displaying the image. Examples of possible user equipment for displaying images based on image data comprise various computers (both fixed and portable computers) and other user devices or equipment adapted to be able to display images based on image data.

The image data may be generated by the same user equipment by which it is displayed or by another equipment. The image data may be stored in memory means of the user equipment. The image data may also be stored in a remote data storage. It is also possible to transport the image data from the remote storage to the user equipment by means of appropriate communication media, such as over a data communication network or by means of a data carrier. If the user equipment is not directly an element of the data network, a data communication media is required between the data network and the user equipment.

The transmission of data between the data network and the user equipment may be accomplished over a wireless interface. Arrangements utilising mobile user equipment and wireless interfaces for the transportation and presentation of images may be referred to by term 'mobile visual communication'. The mobile visual communication can be understood as a technology that enables a mobile user to send and receive images e.g. by using some proprietary method or via a multimedia messaging system (MMS) gateway.

A still image itself does not tell anything else than what was captured in the image when it was taken. Thus the image may not always be sufficiently informative to describe all desired information associated with the image. The image itself may not describe enough about e.g. the context of the target. When an image is transported to a recipient, it may also be desired to be able to mediate additional information associated with the image. For example, some users may wish to transmits additional information regarding the context of the image, such as the temperature at the location of the image, noises surrounding the target, importance of the image, excitement associated with the situation that is presented by the image and so on.

A prior art solution to present additional information has been addition of informative text within or aside the image area. Textual information may also have been contained in the name of the image or the textual information may have been transported as a separate text/description file. However, text information embedded in the picture may use a substantial area of the display screen or otherwise disturb the image. This is an disadvantage especially with the display screen of mobile user equipment, since the display screen thereof has typically a substantially small size. In addition, reading and understanding the text messages requires attention and thus the solutions based on textual messages typically require the user to perceive and process the text in his brain.

In addition, the recipient of the image may wish to view the image or e.g. an MMS message immediately after he/she becomes aware that the reception of image data has commenced. However, downloading of all image data that associates with the image may take a while, especially if the transportation occurs over one or more wireless interfaces.

SUMMARY OF THE INVENTION

Embodiments of the present invention aim to address one or several of the above problems.

According to one aspect of the present invention, there is provided a method for displaying an image comprising: receiving image data associated with the image at a user equipment from a data communication system; generating a visual effect to be presented in association with a version of the image, said visual effect being generated based on additional information associated with the image; displaying said visual effect by display means of the user equipment; and displaying the image by the display means.

According to one aspect of the present invention, there is provided a method in a mobile station for displaying an image on a display means thereof, comprising: receiving image data associated with the image and additional information from a data communication system, said image data and additional information being transmitted over a wireless interface between the mobile station and the data communication system; generating a visual effect to be presented in association with a version of the image, said visual effect being generated based on said additional information; displaying said visual effect by the display means; and displaying the image by the display means.

According to one aspect of the present invention, there is provided a user equipment for displaying an image comprising: receiver means for receiving image data associated with the image from a data communication system; display means for displaying the image based on the received image data; and processor means for generating a visual effect based on additional information associated with the image and for controlling display of the visual effect, wherein the user equipment is arranged to display a version of the image comprising said visual effect.

According to another aspect of the present invention there is provided a communication system, comprising: a data communication media for transporting data between at least two user equipment; a first user equipment for generating image data associated with an image, said first user equipment being adapted to associate additional information with the image data; a second user equipment comprising a receiver means for receiving the image data, a processor means for processing said received image data, and a display means for displaying the image based on the received image data, said second user equipment being also adapted to display an altered version of the image, wherein the altered version comprises a visual effect generated based on said additional information associated with the image.

The embodiments of the invention may provide a possibility to present additional information to the viewer of the image in a visualised form. The visualised information may be presented prior to displaying the original i.e. complete image to the viewer. The additional information about the imaging target may provide the viewer with a better understanding of the image and/or conditions affecting the target of the image, and thus enhance the visual communication. Some of the embodiments enable provision of additional information even before the complete image has been downloaded into the user equipment. Thus the viewer may not need to wait to receive all image data before he/she can already start experiencing information associated with the image.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
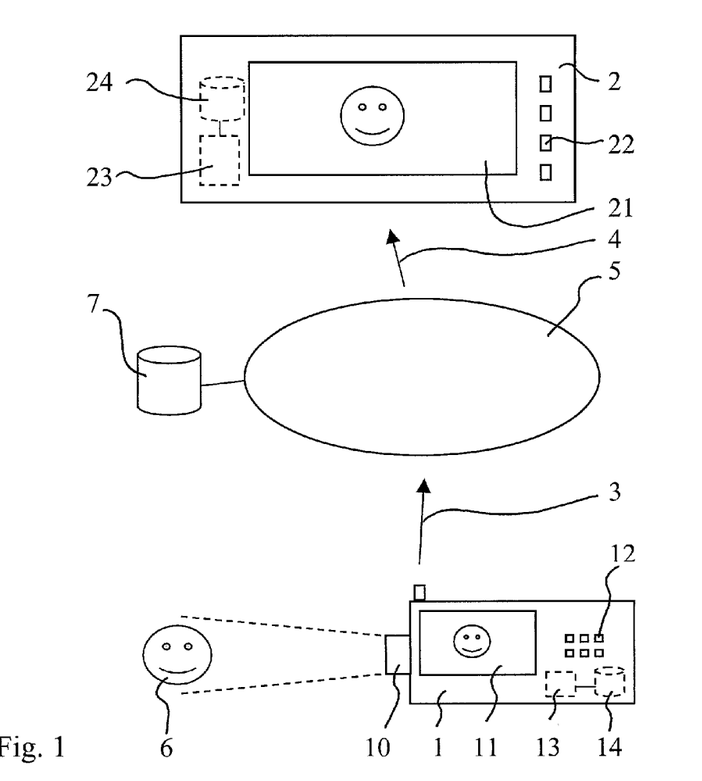
FIG. 1 shows a communication system capable of employing embodiments of the present invention.

FIG. 1 shows user equipment and a communication network that may be used for the embodiments of the present invention. More particularly, FIG. 1 shows a first user equipment 1 and a second user equipment 2 and a communication network 5. The users of the devices 1 and 2 are not shown in FIG. 1 for clarity reasons. The user equipment 1 and 2 are adapted for communication with each other over the data network 5. The communication between the respective user equipment 1,2 and the communication network 5 occurs via a respective wireless interface 3,4. The communication network 5 may be any appropriate network capable of transporting image data.

The first user equipment 1 is provided with imaging means 10, such as a digital camera means. The imaging means 10 are adapted to enable the user of the device 1 to point a lens of the imaging means 10 towards a target 6 of an image and for generating digitised image data of the object 6. The user equipment 1 may be provided with a display 11 for viewing the image e.g. during the "shooting" thereof and/or before transmission of the image data to the second user equipment 2 via the data network 5. Control instructions may be input to the device 1 by means of the control buttons 12.

The second user equipment 2 is provided with a display 21 enabling the user thereof to view an image that has been generated based on image data. The image data may be received from the network 5 via the wireless interface 4. Image data may be stored in an image data storage 24 of the device 2. The operation of the display and/or presentation of any images on the display is controlled by processor means 23. A display software may be adapted to be run in the processor 23 of the user device 2 so that the processor is capable of expressing the additional information on the display 21. Control instructions may be input to the device 2 by means of the control buttons 22.

At the present a system that is based on a multimedia messaging system (MMS) is believed to provide an appropriate pathway for sending and receiving multimedia content, such as still-images, between the user equipment 1 and 2. However, it shall be appreciated that the mobile imaging devices 1 and 2 may also use other data transportation media such as GSM data connection for the exchange of binary information, such as images without departing the scope of the present invention.

FIG. 1 shows also an external database 7. This may be used in some embodiments for storing image data such that the image data may be retrieved from the database upon request from the user device 1 or 2.

In the embodiments of the present invention visual effects, such as different colouring or image quality schemes or graphical elements may be presented to the user with a modified version of the image while the "real" i.e. original version of the image is presented without these visual effects. The effect of the embodiments is based on the fact that half of the primate human cortex is devoted to handling of visual information. Thus the humans are substantially good in analysing any visual information shown to them. Visualised information can typically be understood more effortlessly than other types of information. The visual information can also be understood substantially quickly, such as within half a second or so.

Thus visualisation of additional information may help the viewer to more easily to understand the image and possible background information associated with the image. The following will disclose in more detail different possibilities for dynamic visualisation of additional information to the viewers. Some possible uses of such dynamic visualisation are also discussed.

The additional information to be presented to the viewer of the image may be defined at the time of creation of the image. A possibility for this is to use the imaging apparatus to insert instructions regarding the presentation of the image to the image data, as will be explained in more detail later. The additional information is then visualised in the displaying stage at the receiving terminal, i.e. while the recipient is watching the image. The visualisation process comprises modifying the image between two or more different versions thereof.

There are several possibilities how to employ additional visual effects on the image to give additional information to the viewer of the image. For example, the image may first appear as coloured with a certain colour and intensity, and then quickly turn back to normal. The additional information regarding the context of the image that may be visualised by such a colour change may associate e.g. to temperature or the age of an image.

Other possibilities for visualisation include, without limiting to these, visualisation of a spatial geographic difference between the two user equipment 1, 2 or a location of the transmitting station 1. This may occur e.g. by zooming the image from different areas or edges of the display area 21. Visualisation schemes may also be used to separate different geographic locations or regions that associate with the image or the source (e.g. caller groups or individual callers) of the image. The visualisation may also be used for expressing additional information that associates with emotional feelings or priority information (e.g. low, medium, high). Auditory information about the context of the picture may also be visualised. As a further example, it is also possible to visualise any movements of the user of the sending device 1 or the target 6. Examples of the implementations of these possibilities are described in more detail below with reference to FIGS. 2 to 5.

The user of the transmitting or source device 1 may determine what additional information should be presented to the user of the receiving device 2. The additional information may be inserted manually by the sender of the image. According to a possibility the additional information is added automatically e.g. by sensors in the camera means or similar means capturing the image.

According to an embodiment the additional information can be embedded by the user device 2 within the name of the image file. For example, the name of the image data file could be:

scenery_Temp_Hot.jpg; or
Friend_laughing_MoodHappy.jpg.

The processor 23 of the device 2 is adapted to recognise any image file names containing this type of indications. After recognition the image can be presented accordingly.

At the receiving and displaying device 2 the additional information is visualised e.g. by altering the colours of the image. This can be done e.g. by simply altering the colour index table of the device 2. In the indexing the colour values are interpreted e.g. by means of an appropriate hardware and/or software and the colours of the image will be changed accordingly. The altering may be controlled by the processor 23. This approach is advantageous in that no modification to the bitmap image itself is necessarily needed. In an indexed colour scheme, only the index colour needs be modified. That is, if the image is a 256 colour image, only 256 values must be modified. However, this approach requires that colour indexing is used for the images to be displayed.

Examples of possible formats that use colour indexing schemes include PNG (Portable Network Graphics) and GIF (CompuGraphics Image Format) or similar formats. Colour displays that have no true colours (e.g. 16/24 bit displays) also typically use colour indexing. Some of the true colour systems use indexing to quickly and easily accomplish colour balancing or calibration of the image.

Alternatively, if no colour indexing is used, the system may be adapted to modify the whole bitmap. In this approach two different images are generated, one comprising the visual effect and the other the actual image. In this approach the original image may need to be copied and modified several times to an image buffer of the device 2. Thus this approach may require more processing capacity from the processor 23 than the ones based on indexing.

It also possible to apply the modification on a portion of the image only. For example, only the middle area of the image window can be altered to form the visual effect. This may be accomplished by defining an area of the imaging area which is to be altered in the image data. The creator of the image may use this feature e.g. to highlight the importance of a certain area or object of the image.

The additional information may also be included with the image data as a separate text file. Such a file may be based e.g. on a ASCII, HTML (Hyper Text Markup Language), XML (Extended Markup Language), RDF (Resource Description Framework), a JPEG or JPEG 2000 techniques or any other file that includes a free form field for additional information. For example, in HTML/XML/RDF type formats the content of the additional text file may look like the following example for a description file of the received image:

<name>Greetings from Greece!</name>
<id>#23423423e342</id>
<source>John Smith</source>
<position>N32o23'32"E45o32'23"</position>
<direction>130o</direction>
<time>23-May-2000 12:03:12</time>
<temperature>299K</temperature>
<importance>high</importance>
<category>vacation photo</category>
<keywords>Greece, John, people, flowers, sun, blue sky</keywords>
<related to pictures>#234234e4323, #234234e43243, #23423werw234, . . . </related to pictures>

This information may alternatively be embedded within the image structure or within the image binary content, thus providing more space for the required descriptions. The implementation of systems that use this approach depend on the format that is used for the image.

Figure 6:
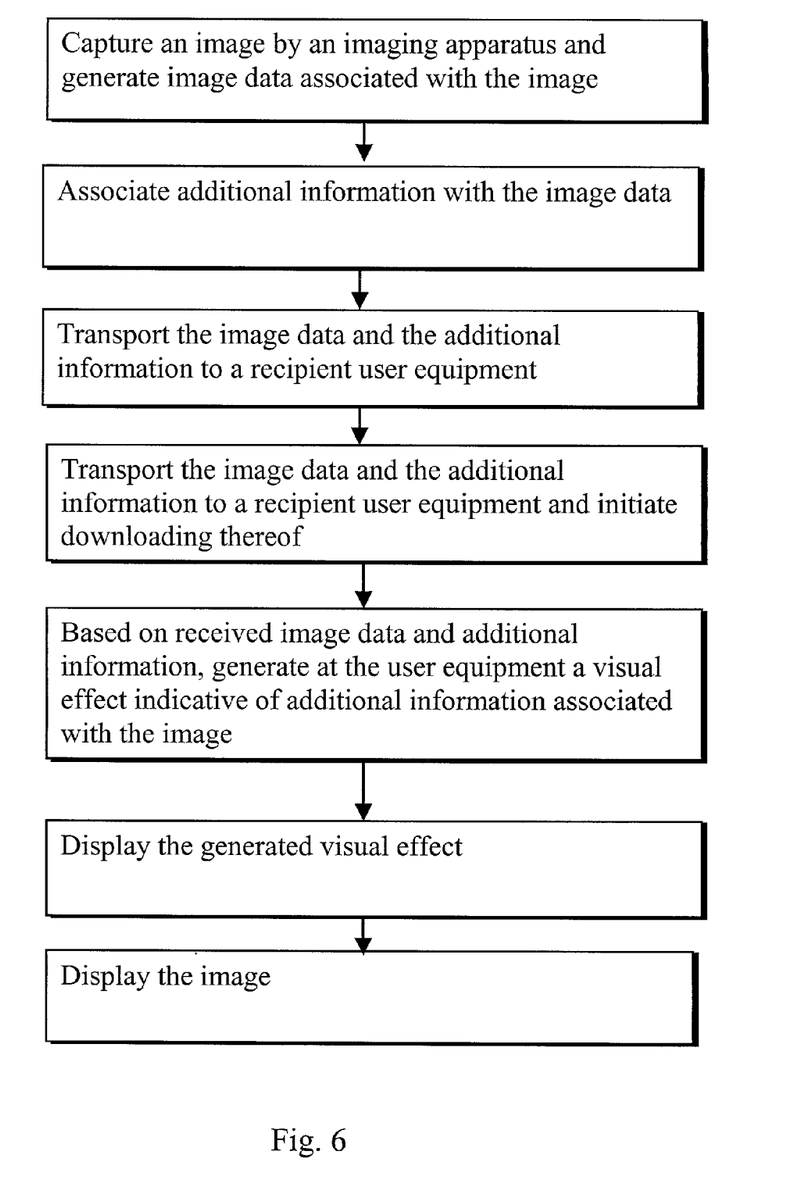
FIG. 6 is a flowchart illustrating the operation of one embodiment of the present invention.

The flowchart of FIG. 6 illustrates a possible operation of the invention. In a preferred mode of operation the visual effects are presented to the viewer and thus the additional information is visually presented to the viewer prior the actual image is displayed for the viewer. For example, a different version of the image is presented first for a certain period of time after the picture has first appeared on a display device prior displaying the complete or final version of the image. The required time period depends on the application. The time period is preferably defined such that it is long enough for the viewers to see the visual effect and to understand the additional information based on the effect but also such that the users do not experience the visual effect as disturbing.

In addition to providing visualised additional information, this embodiment may also provide another advantage that relates to the capability of the receiving device to instantly display an image. That is, a first version of the image may be displayed before all data that associates with the image has been received. The first version does not necessarily need to be as sharp and/or "correct" as the final version. Therefore all image data may not be required before it is possible to display the first version of the image to the viewer. This may be an advantage especially when the image is received over a wireless interface, as the downloading of substantially large image files over the wireless interface may take a while. The embodiment provides a possibility to display additional information to the viewer during the downloading of the image data.

The following will discuss by way of examples possible ways of utilising the invention.

In the first example a user 1 shoots by means of his user equipment 1 an image of a snowy scenery. The image is digitised by means of the processor 13 of the user equipment 1 for the transmission over the data network 5. The user may then transmit the image data to a user device 2 e.g. by means of the MMS.

The image data is received at the mobile user device 2. The processor means 23 recognises that the image data transmission contains text, audio and/or context information that associates with the image. The mobile user device 2 displays the image dynamically. More particularly, at a first step the image is shown with blue and white colours only. However, after a certain period of time, such as 0.5 to 1 seconds or so, the image is presented in normal colours. The user of the device 2 may visually identify the differences between the initial colours and the actual colours. The change in colours will assist the user to understand that it is cold at the imaging target. Vice versa, e.g. for a photograph taken in hot conditions, the first image may be e.g. coloured with orange or red after which the image is changed back to normal.

Figure 2A:
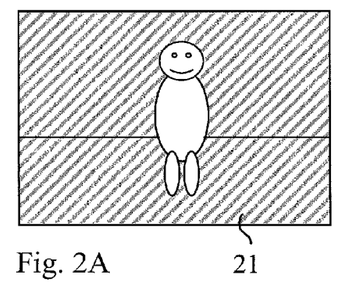
FIGS. 2A and 2B, 3A and 3B, 4A to 4D and 5 illustrate exemplifying embodiments of the invention.
Figure 2B:
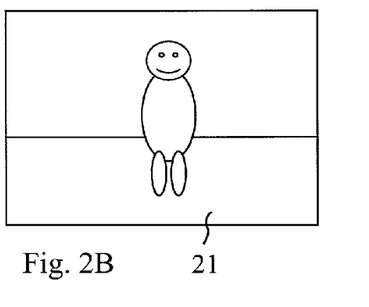

The above described embodiment is illustrated by FIGS. 2A and 2B. FIG. 2A shows the first version of an image, said first version being coloured (the colouring being illustrated by the grid of lines) to indicate a hot temperature. FIG. 2B illustrates the normal version of the image that is shown after the FIG. 2A version has been displayed for a certain period of time.

In another example a user browses images taken by his imaging device and/or images otherwise provided to the user device. It shall be appreciated that in addition to methods in which the images are stored in the user device 20, the images may be stored in a remote picture archive such as in the database 7 of FIG. 1. The remote image storage 7 may be offered by an appropriate service provider. The database 7 may also comprise e.g. a home PC of a user (not shown). The PC is accessible by the mobile station of the user.

The images may be stored for long periods of time. During image browsing and prior presentation thereof to the user, the images may be dynamically modified depending on the age of the image. The visualisation may associate with the age of the image relative to the moment when the image is viewed. The age effect may also indicate the relative difference in age between the image and another image (e.g. a previously viewed image). The visual effect may also indicate the relative age of an image when compared to a set of images.

The visualisation of the age of the image may be based on the known ageing phenomenon of the conventional paper pictures which tend to change in colour when getting older. Typically the old photographs tend to get more yellowish and/or greyish and/or brownish than what they originally were. This known effect can be utilised with the digital images as well. If the age of the digital image is substantially old, the image may be digitally modified such that it first appears e.g. as a greyish and yellowish image, transmuting then back to a normal colour image. Fresh images may also be indicated e.g. by green colour and so on.

Image data files typically comprise data associated with creation date and time of the image, e.g. by means of the so called time-stamp. The age of the image may be determined based on this data by the user equipment 2 and the visual effect may be set accordingly.

The third example utilises location information regarding the location of the user equipment 1 used for transmitting an image. The skilled person is aware of various possibilities for the provision of location information associated with the geographical location of a mobile user equipment, and thus they will not be explained here in detail. It is sufficient to note that substantially accurate geographical location information can be obtained, for example, based on the satellite based GPS (Global Positioning System). More accurate location information can be obtained through a differential GPS. A possibility is to use a location service (LCS) provided by a cellular system for the provision of the location information. In the latter the cells or similar geographically limited access entities and associated controllers of the communication system can be utilised to produce location information associated with a mobile station. The cellular communication system may also be provided with location measurement units that provide more accurate data concerning the location of the user equipment within the service area of the cellular system. The location data may be processed in a specific location service (LCS) node implemented either within the cellular system or connected thereto. Alternatively, or in addition to the LCS node, the location data may be processed in the user equipment provided with appropriate processing capacity. All these techniques are known, and will thus not be discussed herein in more detail.

Figure 3A:
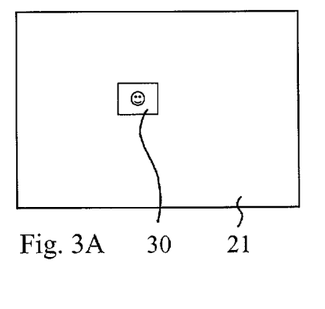
Figure 3B:
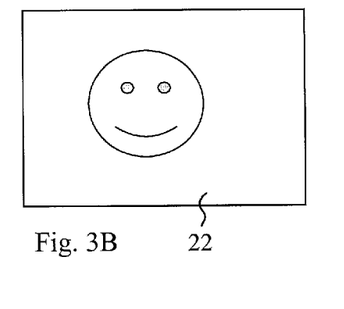
Figure 4A:
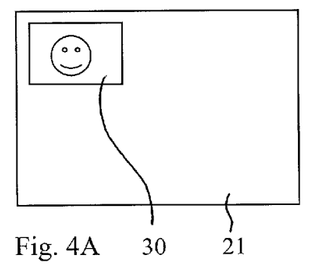
Figure 4B:
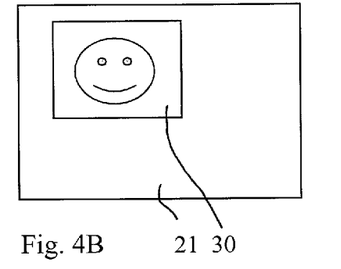
Figure 4C:
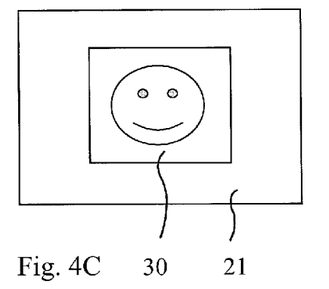
Figure 4D:
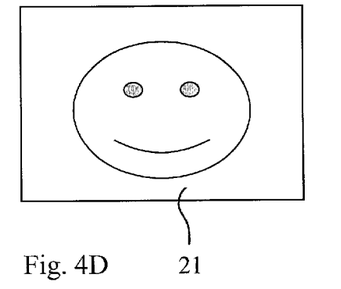

The user equipment 2 may also be made aware of its position. The distance and direction to the user equipment 1 transmitting image data is visualised in the display phase. There are several possibilities for this. For example, as illustrated by FIGS. 3A and 3B, an image taken far away from the location of the user 2 is zoomed in the display such that it starts as a small figure in the centre of the display (FIG. 3A) and increases in size (zooms) to the normal size thereof (FIG. 3B). The more far away the image comes from, the smaller the initial picture frame may be. Alternatively, it may take longer for a far-away image to zoom up to the normal size thereof.

According to a further possibility illustrated by FIGS. 4A to 4D the direction in which the sender is visualised to the user of the receiving terminal. For example, if the image is taken or transmitted geographically north from the user, the image starts zooming from the top of the display. If the image is taken or transmitted east from the user, the image starts zooming from the right of the display, and so on.

Additionally, the receiving mobile device 2 may be made aware of its position and direction (e.g. by means of a digital compass). If the location data concerning the transmitting device 1 is also provided to the receiving device 2, it is possible to control the display such that the image moves relatively on the display 21 based on the relative direction between the transmitting device 1 and the receiving device 2. For example, if an image arrived from the north and the user is facing the east, the image could appear from the left of the display 21, instead of the top of the display.

The capability of receive visualised information regarding the relative positioning may be useful e.g. in the future professional cyber tools that may be used in professions such as guards, policemen and maintenance personnel, who collaborate in a team in a scene and exchange images of views they are facing. The users may even be provided with head-mounted displays and cameras, wearable computers and wireless connectivity.

Figure 5:
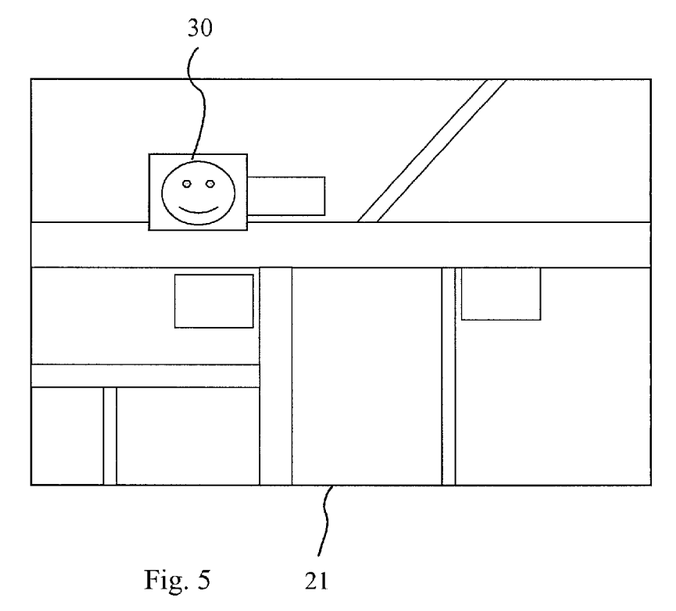

According to a possibility a map of the area where the transmitting user equipment is located or what is illustrated by the image is shown by the display. Based on the location information the image received by the receiving user equipment "pops up" from a certain location in the map. For example, an image taken in London pops up or zooms out from the London area on a map showing England. In a city, the image may pop up from a specific street or building on a local map and so on. This is illustrated by FIG. 5.

The visual effect is provided by displaying a distorted version of the image. For example, the image may be inclined, stretched, granular or come out from a screw or otherwise be purposively distorted from the final image.

According to a further example the user may associate some colouring schemes to different locations. For example, if the user equipment 2 receives images about the region of the workplace of the user (sent e.g. by his colleagues), these images may appear first as red. If the images show the user's home region, the images may first appear e.g. as green. This colour information would indicate immediately additional information about the geographical source of the image. If the user knows that the image is taken in a certain environment (e.g. home/work), this may accelerate and ease the perception and identification of the image.

Images received from persons belonging to different caller groups may be visualised in a similar manner as well. For example, images sent by family members will first appear as green, images sent by work-mates appear as red, images sent by friends appear as blue and so on. It shall be appreciated that other visualisation effects, such as movements of the images and so on, may also be used to identify the caller groups.

In accordance with a further embodiment emotional feelings of the sender are transmitted to the receiver of the image by means of the visualised additional information. For example, vacation photographs of subjects such as scenery, people, statues may have strong emotional impact on the person taking the picture. However, these photographs may not create the same emotional feeling in the recipient as what the sender felt. It may be important for the sender to be able to mediate his emotional state (e.g. excitement) since it may have been the reason for taking the picture in the first place. The emotional or affective information may be attached with the image and visualised in the display phase by using different colours (as described above) or other visual effects. The other effect may be such as shaking of the image, zooming of the image, despeckling of the image, building up the image out of blocks and so on.

The user equipment 1 of the sender may be provided with appropriate physiological sensors for sensing emotional information about the sender so that the information may be derived automatically. The emotional state may be found out using emotion recognition methods, such as recognition of mood from voice or gestures or other physiological signals. The emotional status may also be given manually by the sender by means of appropriate input means provided in the sending user equipment.

According to a further embodiment information regarding auditory events is shown visually to the viewer of the image. A short auditory scene sample associated with the target of the image may be recorded and transmitted along with the image. In order for the recipient user to get the knowledge of this auditory information during the display phase, the user must typically listen to the recordings while watching the image. However, in many instances, such as in a bus or train, the user may not wish to do so as it might be disrupting and/or a non-deliberate eavesdropping may occur. The auditory information about the image's context may be visualised in the beginning of watching the image by appropriate visual effects. These effect may comprise the effect explained above, that is a colour change, zooming and so on. For example, if loud noises were present at the scene, a red initial colour and/or shaky movement may be used to visualise this. If the target scene was silent, a grey and still image may be displayed to the recipient user.

A further embodiment relates to a possibility of visualising movements of an object in a stationary still image. Thus the still images explain little about the movements in the picture, although a motion blur in the image might tell something. Even if the viewer realises that some movement is involved, it may be difficult for the viewer to conclude whether it is the user or the objects in the scene which are moving. Video would naturally reveal this but the recipient user equipment may support only still-images, or more expensive video transmission is not desired for the transmission of the image data.

The movement of the sender may be analysed using a set of accelerometer sensors provided in the imaging device. The movement in the scene may be analysed by appropriate image analysis methods. The movement information is attached with the image data sent to the recipient. After reception, the data is visualised to the recipient user 2. For example, the image may move from the left of the display to the middle, or shake for a short period of time prior to displaying the proper image. This would indicate that the sending user 1 was moving while he/she was taking the image. Although a camera-shoot is usually stationary, the camera may be e.g. head-mounted and the user may be in move. An example of such a user is a worker operating with wearable computers.

The change between different version of an image may occur at once. The change may occur by smoothly "sliding" from the first version of the image towards the real image. The sliding may occur by means of small steps between e.g. differently coloured version of an image.

Due to the characteristics of the human eye, the absolute degree of coloration may not always be an especially effective way of describing any accurate information, such as an accurate value of temperature. However, the human beings recognise easily difference between colours and/or changes in colours. The different colours are thus believed to be a good visual effect when describing approximate or relative values, which is often sufficient. For more accurate information it is possible to add e.g. textual notification in addition to the visual effect.

User equipment such as mobile stations with image processing capability and data communication systems that enable mobile users to transport substantially large data files to each other are beginning to be available for the public. The users of such devices may find that the display of visual effects on images is of great benefit for them. For example, mobile subscribers may wish to sent images to each others just for fun. The visual effects may add the entertainment value of the images, even in instances where the effects may have no informative value. The additional information may also be used for personalization of the images.

Examples of the possibilities for the data communication network 5 of FIG. 1 include, without limiting to these, standards and/or specifications such as GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access), IS-95 or $3^{rd}$ generation UMTS (Universal Mobile Telecommunications System), IMT 2000 (International Mobile Telecommunications 2000) and so on.

It should be appreciated that whilst embodiments of the present invention have been described in relation to mobile user equipment such as mobile stations 1 and 2 of FIG. 1, embodiments of the present invention are applicable to any other suitable type of user equipment. Therefore it shall be appreciated that in addition to mobile visual communication devices, the invention may be employed e.g. in any image archive and/or browsing software run e.g. in an ordinary desktop computer. The image data may be sent in any suitable format.

The user equipment may be switched between modes in which the visual effects are displayed and in which the effects are not displayed. Those user equipment which are not capable of displaying the visual effect may simply ignore the additional information and display the image in a conventional manner. It is also possible to associate an indication to the image data which either allows or prevents display of any visual effects. The indication may be e.g. a permission flag.

It is also noted herein that while the above describes exemplifying embodiments of the invention, there are several variations and modifications which may be made to the disclosed solution without departing from the scope of the present invention as defined in the appended claims.

The invention claimed is:

1. A method comprising:
   receiving both image data for generating an image and additional visual effect information at a user equipment from a data communication system;
   generating a visual effect to be presented in association with a version of the image, said visual effect being generated based on said visual effect information, wherein the visual effect visualizes information that is associated with a context or content of the image, and wherein the visual effect visualizes at least one of the following features: a temperature in the target of the image, a time when the image was created, movements associated with the image, and emotional feelings associated with the image; and
   after said receiving and generating, displaying, at said user equipment, the version of said image with said visual effect on a display of the user equipment and the image without said visual effect on the display in a predetermined time sequence.

2. A method as claimed in claim 1, wherein said displaying of said version of the image with said visual effect is done before said displaying of the image without said visual effect.

3. A method as claimed in claim 1, wherein said displaying of said version of said image with said visual effect is started before all image data that associates with the image has been received in its entirety from the data communication system.

4. A method as claimed in claim 1, wherein said displaying of said version of said image with the visual effect is done at said user equipment for a predefined period of time.

5. A method according to claim 1, wherein the visual effect visualizes the age of the image.

6. A method as claimed in claim 1, wherein the visual effect visualizes a location.

7. A method as claimed in claim 6, wherein the location is the location of the source of the image data.

8. A method as claimed in claim 7, wherein the source comprises the location of the target of the image or the location of the imaging apparatus capturing the image.

9. A method as claimed in claim 6, wherein the visual effect visualizes relative location between a device at which the image was taken and the user equipment.

10. A method as claimed in claim 9, comprising: receiving first position data associated with the geographical location of the user equipment; receiving second position data associated with the geographical location of the device at which the image was taken; and processing said first and second location data for obtaining said relative location.

11. A method as claimed in claim 10, wherein the processing is accomplished by a processor of the user equipment.

12. A method as claimed in claim 6, comprising use of information associated with the directional position of the user equipment.

13. A method as claimed in claim 6, wherein the location is visualized by displaying a version of the image on a position on the display that depends on the location of where the image was captured or of the device at which the image was taken.

14. A method as claimed in claim 13, further comprising displaying a map, wherein a location on said map is visualized by associating said version of the image with a position on the map.

15. A method as claimed in claim 13, wherein locations to the north of the user equipment are indicated by associating the displaying of the version of the image with the top portion of the display, locations to the south of the user equipment are indicated by associating the displaying of the version of the image with the lower portion of the display, locations to the west of the user equipment are indicated by associating the displaying of the version of the image with the left portion of the display, and locations to the east of the user equipment are indicated by associating the displaying of the version of the image with the right portion of the display.

16. A method as claimed in claim 6, wherein the size of the image visualizes the distance between the location and the user equipment.

17. A method as claimed in claim 16, wherein the size of the image is changed at a speed that visualizes the distance between the location and the user equipment.

18. A method as claimed in claim 1, wherein the visual effect comprises moving a version of the image on the display so that the image appears at different locations on the display.

19. A method as claimed in claim 1, wherein the visual effect is indicative of the importance of the image.

20. A method as claimed in claim 1, wherein the visual effect is indicative of a priority order of the image.

21. A method as claimed in claim 1, wherein the visual effect visualizes an audio effect associated with the image.

22. A method as claimed in claim 1, wherein the visual effect is indicative of the origin of the image.

23. A method as claimed in claim 22, wherein the visual effect indicates a group of persons.

24. A method as claimed in claim 1, wherein the presentation of the visual effect comprises presentation of a differently colored version of the image.

25. A method as claimed in claim 24, wherein a predefined color during the presentation of the visual effect visualizes a predefined condition.

26. A method as claimed in claim 24, wherein at least one color of the image is modified by altering a color index table of the image.

27. A method as claimed in claim 24, wherein at least one color of the image is modified by modifying a bitmap of the image.

28. A method as claimed in claim 1, wherein the additional information is obtained from the name of an image data file.

29. A method as claimed in claim 1, wherein the additional information is included in the image data.

30. A method as claimed in claim 1, wherein the additional information is included in a separate field of an image data file.

31. A method as claimed in claim 1, wherein the presentation of the visual effect comprises provision of a shaking or vibrating version of the image.

32. A method as claimed in claim 1, wherein the presentation of the visual effect comprises provision of a distorted version of the image.

33. A method as claimed in claim 1, wherein the presentation of the visual effect comprises provision of at least one differently sized version of the image.

34. A method as claimed in claim 1, wherein the image data is transmitted over a wireless interface between the user equipment and the data network.

35. A method as claimed in claim 34, wherein the user equipment comprises a mobile station adapted for communication with a cellular communication network.

36. A method, comprising:
receiving, at a mobile station having a display, both image data for generating an image and visual effect information from a data communication system, said image data and additional information being transmitted over a wireless interface between the mobile station and the data communication system;
generating a visual effect to be presented in association with a version of the image, said visual effect being generated based on said visual effect information, wherein the visual effect visualizes information that is associated with a context or content of the image, and wherein the visual effect visualizes at least one of the following features: a temperature in the target of the image, a time when the image was created, movements associated with the image, and emotional feelings associated with the image; and
after said receiving and generating, displaying on the mobile station display a version of the image with said visual effect and the image without said visual effect on the mobile station display in a predetermined time sequence.

37. Apparatus comprising:
a receiver configured to receive both image data associated with an image and additional associated information from a data communication system;
a display; and
a processor configured to generate a visual effect based on said additional information associated with the image and control display of the image without the visual effect on the display and a version of the image with the visual effect on the display in a predetermined time sequence after the receiver receives the image data and associated information, wherein the visual effect visualizes information that is associated with a context or content of the image, and wherein the visual effect visualizes at least one of the following features: a temperature in the target of the image, a time when the image was created, movements associated with the image, and emotional feelings associated with the image.

38. An apparatus as claimed in claim 37, wherein the processor is configured to display said version of the image with the visual effect before displaying the image without the visual effect.

39. Apparatus as claimed in claim 38, wherein the processor is configured to display said version of the image with the visual effect before all image data has been received in its entirety from the data communication system.

40. Apparatus as claimed in claim 37, which is configured to display said version of the image with the visual effect for a predefined period of time.

41. Apparatus according to claim 37, wherein the visual effect visualizes the age of the image.

42. Apparatus as claimed in claim 37, wherein the visual effect visualizes a location.

43. Apparatus as claimed in claim 42, wherein the location is the location of the source of the image data.

44. Apparatus as claimed in claim 43, wherein the source comprises the location of the target of the image or the location of the imaging apparatus capturing the image.

45. Apparatus as claimed in claim 42, wherein the visual effect visualizes relative location between the apparatus and a device at which the image was taken.

46. Apparatus as claimed in claim 42, which is configured to use information associated with the directional position of the user equipment.

47. Apparatus as claimed in claim 42, which is configured to visualize the location by displaying a version of the image on a position on the display that depends on the location of where the image was captured or of a device at which the image was taken.

48. Apparatus as claimed in claim 47, which is further configured to: display a map, wherein a location on said map is visualized by associating said version of the image with a position on the map.

49. Apparatus as claimed in claim 47, wherein locations to the north of the user equipment are indicated by associating the displaying of the version of the image with the top portion of the display, locations to the south of the user equipment are indicated by associating the displaying of the version of the image with the lower portion of the display, locations to the west of the user equipment are indicated by associating the displaying of the version of the image with the left portion of the display, and locations to the east of the user equipment are indicated by associating the displaying of the version of the image with the right portion of the display.

50. Apparatus as claimed in claim 42, wherein the size of the image visualizes the distance between the location and the user equipment.

51. Apparatus as claimed in claim 50, which is further configured to change the size of the image at a speed that visualizes the distance between the location and the user equipment.

52. Apparatus as claimed in claim 37, wherein the visual effect comprises moving a version of the image on the display so that the image appears at different locations on the display.

53. Apparatus as claimed in claim 37, wherein the visual effect is indicative of the importance of the image.

54. Apparatus as claimed in claim 37, wherein the visual effect is indicative of a priority order of the image.

55. Apparatus as claimed in claim 37, wherein the visual effect visualizes an audio effect associated with the image.

56. Apparatus as claimed in claim 37, wherein the visual effect is indicative of the origin of the image.

57. Apparatus as claimed in claim 56, wherein the visual effect indicates a group of persons.

58. Apparatus as claimed in claim 37, wherein said version of the image comprising the visual effect comprises a differently colored version of the image.

59. Apparatus as claimed in claim 58, wherein a predefined color visualizes a predefined condition.

60. Apparatus as claimed in claim 58, which is configured to modify at least one color of the image by altering a color index table of the image.

61. Apparatus as claimed in claim 58, which is configured to modify at least one color of the image by modifying a bitmap of the image.

62. Apparatus as claimed in claim 37, wherein the additional information is obtained from the name of an image data file.

63. Apparatus as claimed in claim 37, wherein the additional information is included in the image data.

64. Apparatus as claimed in claim 37, wherein the additional information is included in a separate field of an image data file.

65. Apparatus as claimed in claim 37, wherein the visual effect comprises provision of a shaking or vibrating version of the image.

66. Apparatus as claimed in claim 37, wherein the visual effect comprises provision of a distorted version of the image.

67. Apparatus as claimed in claim 37, wherein the visual effect comprises provision of at least one differently sized version of the image.

68. Apparatus as claimed in claim 37, wherein the image data is received over a wireless interface.

69. Apparatus as claimed in claim 68, which is part of a mobile station adapted for communication with a cellular communication network.

70. Apparatus as claimed in claim 37, which is configured to:
  receive first position data associated with the geographical location of said apparatus;
  receive second position data associated with the geographical location of the source of the image data; and
  process said first and second location data for obtaining said relative location.

71. A computer-readable memory having stored thereon computer-executable instructions for performing a method, the method comprising:
  receiving both image data for generating an image and additional visual effect information at a user equipment from a data communication system;
  generating a visual effect to be presented in association with a version of the image, said visual effect being generated based on said visual effect information, wherein the visual effect visualizes information that is associated with a context or content of the image, and wherein the visual effect visualizes at least one of the following features: a temperature in the target of the image, a time when the image was created, movements associated with the image, and emotional feelings associated with the image; and after said receiving and generating, displaying at said user equipment a version of said image with said visual effect on a display of the user equipment and the image without said visual effect on the display in a predetermined time sequence.

72. The computer-readable memory as claimed in claim 71, wherein said displaying of said version of the image associated with the visual effect is done before said displaying of said image without said visual effect.

73. The computer-readable memory as claimed in claim 71, wherein said displaying of said version of said image with said visual effect is started before all image data that associates with the image has been received in its entirety from the data communication system.

74. The computer-readable memory as claimed in claim 71, wherein said displaying of said version of said image with said visual effect is done at said user equipment for a predefined period of time.

75. A communication system, comprising:
a data communication media for transporting data between at least two user equipment;
a first user equipment including a camera configured to capture an image and generate image data associated with the captured image, said first user equipment being adapted to associate visual effect information with the image data; and
a second user equipment comprising a receiver means for receiving the image data and visual effect information from the first user equipment, a processor means for processing said received image data, and a display means for displaying the image based on the received image data, said second user equipment being also adapted to display the image and an altered version of the image in a predetermined time sequence, wherein the altered version comprises a visual effect generated based on said visual effect information, wherein the visual effect visualizes information that is associated with a context or content of the image, and wherein the visual effect visualizes at least one of the following features: a temperature in the target of the image, a time when the image was created, movements associated with the image, and emotional feelings associated with the image.

76. A method, comprising:
sending both image data associated with an image and additional information associated with content of the image from a first party to user equipment of a second party via a data communication system;
generating on the basis of said additional information a visual effect to be presented in association with a version of the image, said visual effect visualizing said information associated with the context or content of the image, wherein the visual effect visualizes at least one of the following features: a temperature in the target of the image, a time when the image was created, movements associated with the image, and emotional feelings associated with the image; and
after the sending and generating, displaying on a display of the user equipment said visual effect and the image on the display without the visual effect in a predetermined time sequence.

77. The method of claim 76, wherein the predetermined sequence is determined by the additional associated information.

78. The method of claim 77, wherein the predetermined sequence conveys a message and has meaning that is associated with a context of said image.

* * * * *